Figure 11:
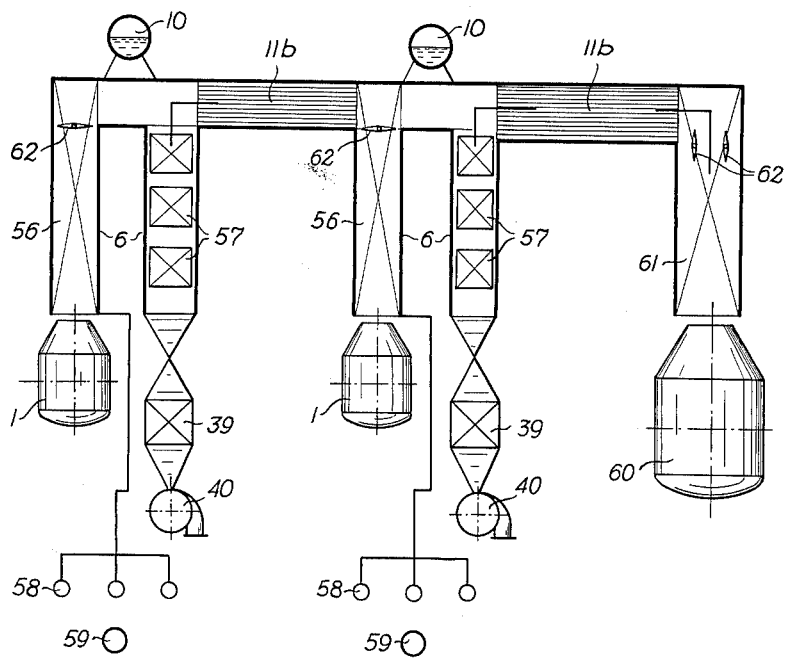

Dec. 21, 1965  R. KEMMETMÜLLER  3,224,841
PLANT FOR COOLING AND CLEANING WASTE-GASES IN STEELWORKS
Filed Oct. 30, 1962  5 Sheets-Sheet 1
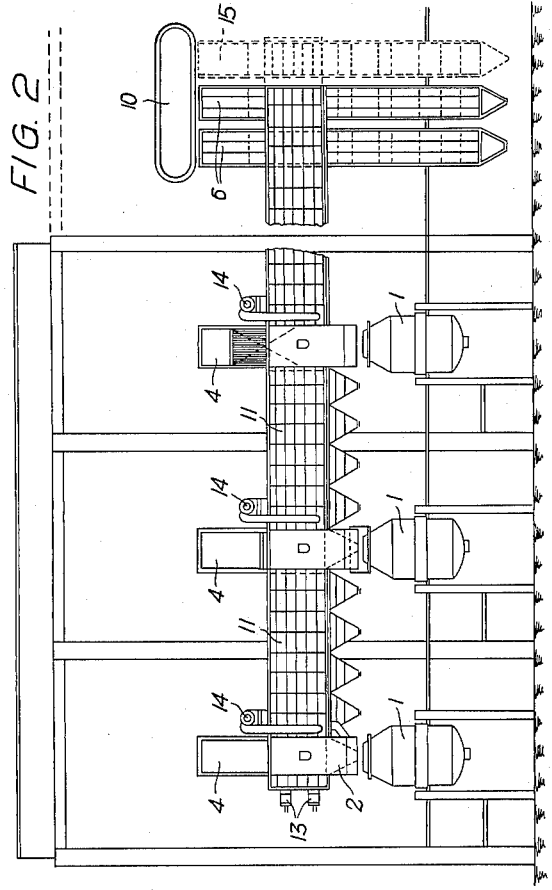
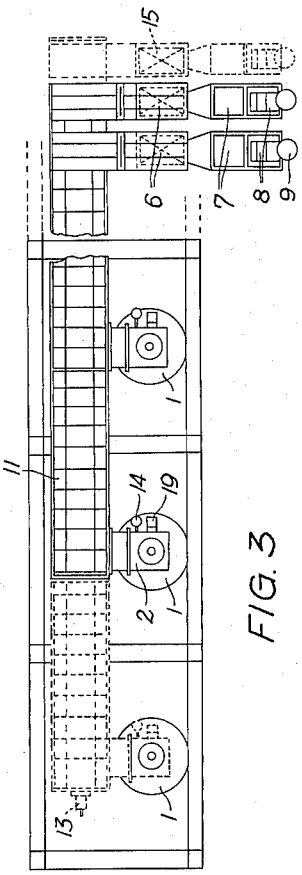
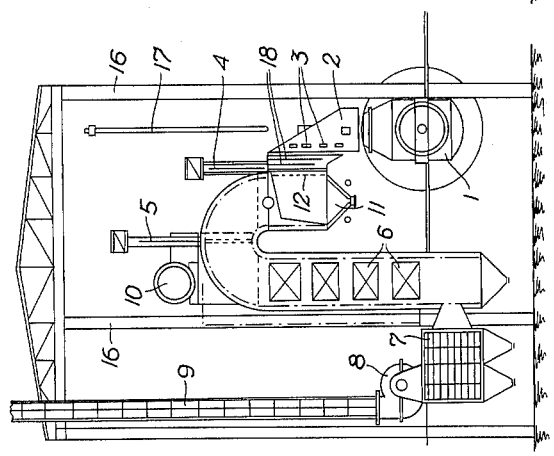

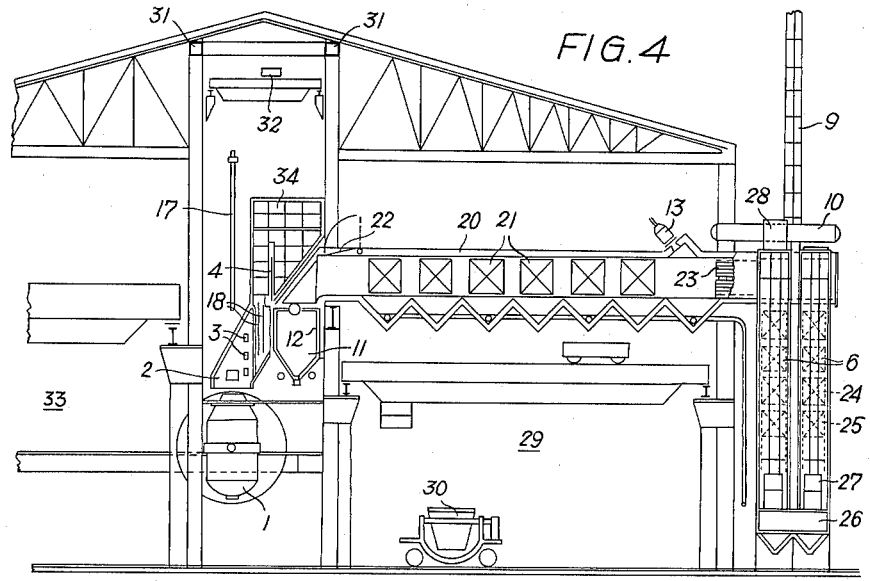
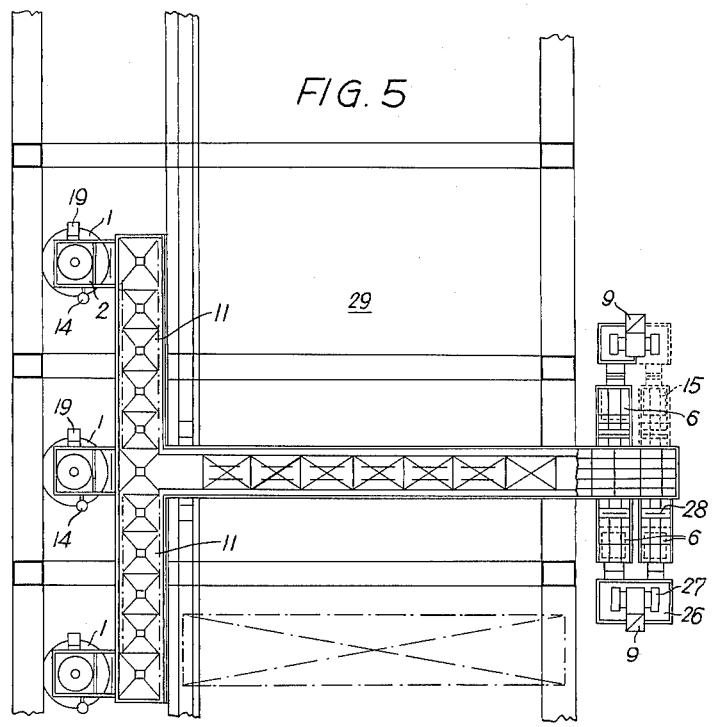

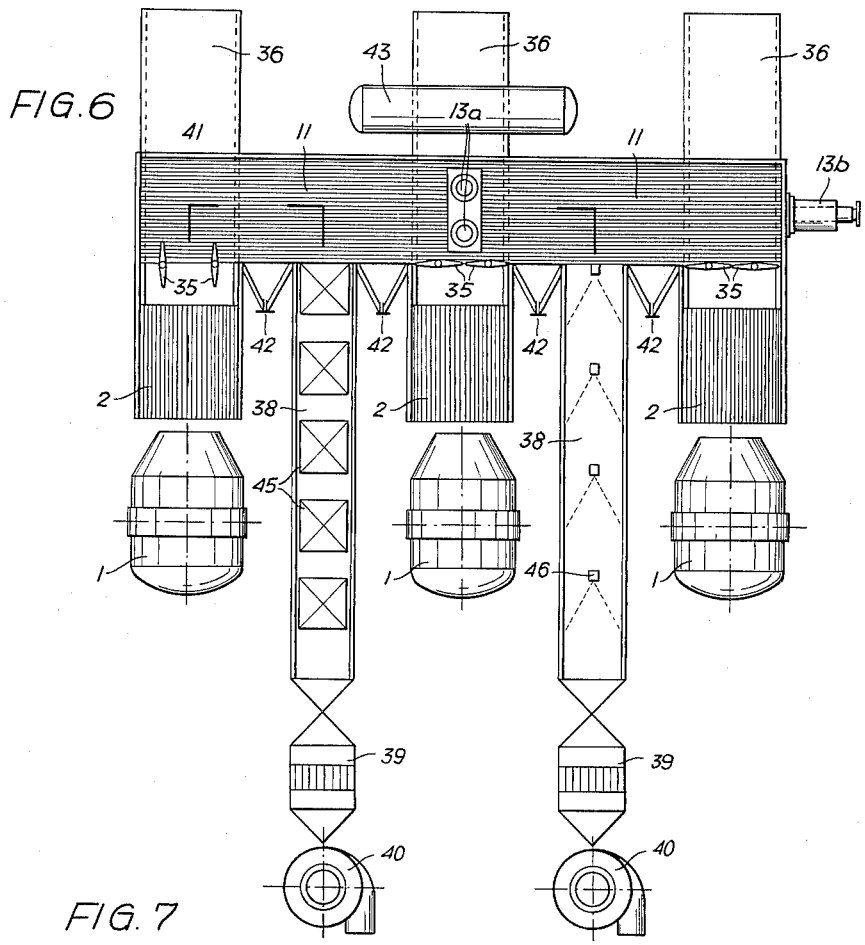
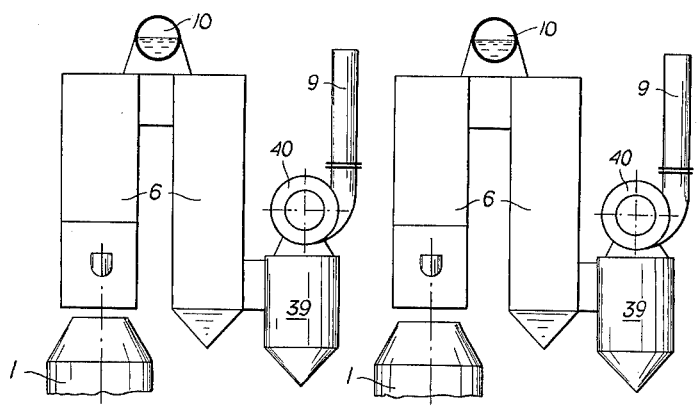

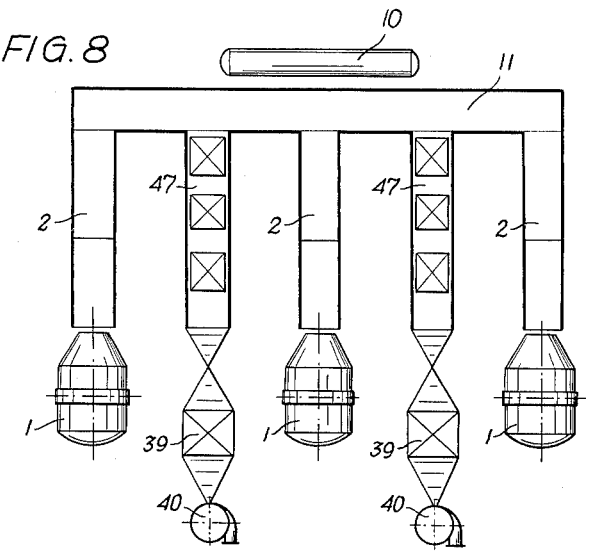
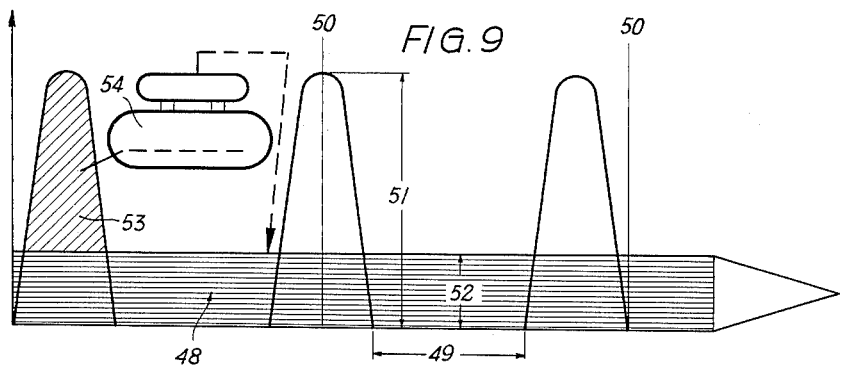
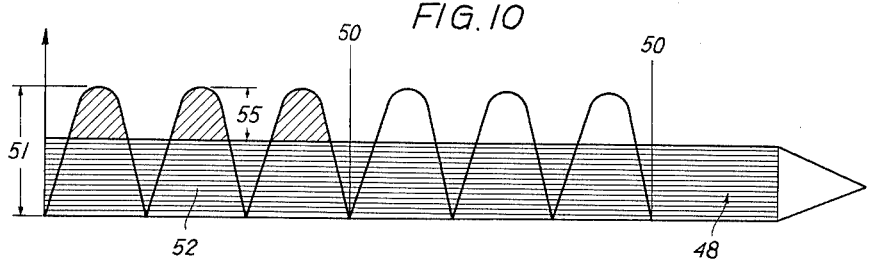

3,224,841
PLANT FOR COOLING AND CLEANING WASTE-
GASES IN STEELWORKS
Roland Kemmetmüller, Vienna, Austria, assignor to
Waagner-Biro Aktiengesellschaft, Vienna, Austria, a
firm of Austria
Filed Oct. 30, 1962, Ser. No. 234,082
Claims priority, application Japan, Nov. 8, 1961,
36/40,338; Austria, Apr. 3, 1962, A 2,711/62
6 Claims. (Cl. 23—277)

Plants for cooling and cleaning the waste gases of steelworks furnaces are known in very different embodiments. Plants have been built wherein a separate waste gas cooling and cleaning plant was assigned to every steelworks furnace. In case of enlargements of the steelworks a new waste gas cooling and cleaning plant was built to every new furnace unit. Plants of this kind have given satisfactory results in the practice many times, however, they involve high initial costs. Those separate plants for each furnace unit have been preferred because it was desired to control and supervise independently the corresponding cooling and cleaning plants in spite of the varying operating conditions.

There have been built plants already wherein two furnace units for instance are alternatingly connected to one common waste gas cooling and cleaning plant. Plants of this kind had the disadvantage that in case of operating troubles of the waste gas cooling and cleaning plant the hot furnace gases had to be blown out into the atmosphere uncooled and uncleaned through emergency chimneys if the operation of the furnaces was to be continued. Further the usually existing shortage of space in steelworks complicated the housing of the waste gas cooling and cleaning plants in the steelworks building.

Contrary to this the present invention shows various advantages. Advantageously several steelworks furnaces arranged in a steelworks building each blow their hot waste gases through a suction hood to a precooler wherein they are partly or completely burnt and precooled. These coolers for instance can be lined with radiation heating surfaces. At the end of the precoolers the precooled converter gases flow to a common duct which connects all the precoolers of the single steelworks furnaces. At least two aftercooling and cleaning plants are connected to this collecting duct at suitable places; therein the gases of all the steelworks furnaces in the order of their working sequences transfer the remaining heat and are cleaned, respectively. According to the invention also the gas collecting duct is lined with cooling surfaces. These for instance can also be radiation heating surfaces.

This inventive arrangement offers also the possibility of housing the aftercooling and cleaning plants outside the steelworks building, for instance immediately attached to the same. This arrangement has the advantage that for instance three, four or more steelworks furnaces working alternatingly one after the other need only two aftercooling and cleaning plants; the capacity of each plant must be adjusted to the maximum amount of gas occurring per time unit. If such a steelworks plant is enlarged by additional steelworks furnaces there is given the possibility according to the invention to connect additional precoolers to the gas collecting duct without being forced for this reason to add aftercoolers. Thus the initial costs of plants of this kind can be reduced. There is a further advantage of providing at least two aftercooling plants, and cleaning plants, respectively: one of these plants at a time can be switched off for cleaning and repairing while the other plant is supplied with gases.

However, there is also the possibility of lining the gas collecting duct according to the invention with regenerative heating surface which transfer their heat to a cool air sucked intermittently through during the working intervals of the steelworks furnaces working through the gas collecting duct; thus the after cooling plants are supplied with a constant amount of gas at a time. In such a plant, in the gas collecting duct there can be arranged one or several additional heating means, as known per se; if these are worked during the blowing intervals of the steelworks furnaces the gases flowing into the aftercooling plants have a constant temperature. In a manner known per se the precoolers of each steelworks furnace are equipped at their ends with an emergency chimney which can be connected and disconnected. In order to be able to lay off of works the single steelworks furnaces for emptying, recharging or repairing the precoolers in a manner known per se can be disconnected from the gas collecting duct by means of shutoff devices. The aftercooling plants, too, can be disconnected from the gas collecting duct in case of necessity by means of suitable shutoff devices or can be connected to said gas collecting duct. The aftercoolers in a manner known per se can be provided in the form of waste heat boilers for producing steam and/or in the form of air heaters and gas heaters, respectively, however, they can also be arranged in the form of surface coolers or injection coolers.

The inventive arrangement make it also possible to enlarge, at relatively low costs, a plant having two or several steelworks furnaces provided that their waste gas cooling plant is designed as a two flue construction with a subdivision in radiation heating surfaces and contact heating surfaces. For this purpose the radiation heating surfaces of existing steelworks furnaces are connected at their ends by a gas collecting duct one with the other; to said duct the radiation heating surface of the new steelworks furnace or furnaces is (are) connected as precoolers. The new steelworks furnaces need no additional aftercoolers as also the convection heating surfaces of the existing steel works furnaces are connected as aftercoolers to the gas collecting duct. The greatest capacity of the new steelworks furnaces is governed by the efficiency of the existent afterheating surfaces; advantageously again one flue having afterheating surfaces is kept as a reserve.

In the drawing the object of the invention is shown by way of example in several embodiments.

FIG. 1 shows a section through a steelworks plant of such a kind, oxygen converters being shown as steel producing furnaces. FIG. 2 shows the front-elevation through the converter steelworks with the common gas collecting duct and a central plant for waste gas cooling and gas cleaning. FIG. 3 shows a top view of the same converter steel works, the central waste gas cooling and cleaning plant being arranged within the steelworks. FIG. 4 shows a section through a converter steelworks and shows a common gas collecting duct which is provided in the form of a regeneratively working heat accumulator (regenerator), the central waste gas cooling and cleaning plant here being arranged outside of the steel works. FIG. 5 shows a top view of the same converter steelworks, the waste heat boiler plants and the dust separating plants being subdivided in four groups, one group at a time being shut down for inspection.

FIGS. 6, 8, 10 and 11 are concerned with further embodiments of the object of the invention. In the FIGS. 7 and 9 the conditions with a known dust separating plant are shown.

The FIGS. 1 to 5 show only some embodiments of the plants of the kind according to the invention and by no means will restrict the inventive idea.

In special cases the waste gases from the single furnaces may be passed also unburned through the gas collecting duct, and thereafter can be burned shortly before entering the central cooling plant by admitting air.

Advantageously the gas collecting duct is provided with water-cooled and/or steam-cooled walls at those places where the gas is burned, as shown in the FIGS. 1 to 5.

FIG. 1 shows the cross section through a plant according to the inventive idea. 1 is the converter wherein raw iron is reduced to steel with pure oxygen which is blown in through the lance 17. The resulting waste gases are taken up by the suction hood which is water-cooled and/or steam-cooled. In this example combustion air is added to the hot converter waste-gases through the openings 3 to cause combustion of the gases. In order to prevent slag from entering the gas collecting duct 11 there is provided for instance a slag collecting device 18. The cooled suction hood 2 can be taken off or turned around. The slide 4 allows the suction hood 2 and the gas collecting duct 11 to be separated impermeably for gas. In this embodiment the gas collecting duct is formed as radiating part of the centrally arranged waste heat boiler 6. The walls of the gas collecting duct are lined with steam tubes 12 which are arranged tightly side by side. From the suction hood 2 waste gases are passed to the collecting duct 11 and through said duct are further passed to the common waste heat boiler 6 where they are cooled. The common waste heat boiler 6 can be separated from the gas collecting duct by means of the slide 5. Then the dust is removed from the cooled gases in the dust separating plant 7. The entire gas transportation through the plant is effected by an exhaust fan 8 which then presses the cleaned waste gases through the chimney 9 into the atmosphere. 10 indicates the boiler drum of the entire system. The walls of the gas collecting duct formed to be radiation heating surfaces for instance are provided as forced circulation heating surfaces (La Mont System). However, they also can be arranged easily to be natural circulation heating surfaces. The entire plant is arranged in the heavy construction part 16 of the steelworks.

FIG. 2 shows a front elevation through the steelworks. As there may be seen, three steel producing furnaces 1 are together assembled and connected on the gas collecting duct 11. This gas collecting duct is arranged horizontally, that is to say parallel to the converters. The single converters can be connected to or disconnected from the gas duct 11 at random by means of the slides 4. 14 indicates the secondary air device which supplies the required combustion air to the converter waste gases. 13 indicates an additional heating means which has the purpose of supplying heat to the waste heat boiler during those periods in which the converters do not produce any heat, in order to avoid variations in the production of heat. 6 shows the waste heat utilization plant (waste heat boiler) which is subdivided in two groups. 15 is a reserve group. All the three groups can be connected or disconnected at random.

FIG. 3 shows the horizontal projection of the steelworks with the entire waste gas cooling and cleaning plant. 14 shows the secondary air plant and 19 is the supply opening for the materials to be added (flux materials). 6 again indicates the waste heat boiler plant subdivided in two groups; 15 is the reserve group. The dust separating plant is denoted with 7 and the exhausters with 8.

FIG. 4 shows another embodiment of the inventive idea. On principle again the example of a converter steelworks having three converters is chosen.

1 indicates a converter wherein again crude iron is reduced to steel by means of oxygen through an oxygen lance 17. The waste gases produced in the converter 1 are taken up by the suction hood 2 which again is arranged to be taken off or to be turned. The gases are inflamed by supplying air through the openings 3; then said gases are passed to a collecting duct 11 arranged parallel to the converters. The slag carried along by the converter gases is caught by the slag collector 18 to prevent said slag from entering the collecting duct 11. The transverse collecting duct is formed to be a radiation part of the common waste heat boiler 6. The single converters can be connected to or disconnected from the transverse collecting duct at random by means of the slides 4. 12 shows how the transverse collecting duct is provided with tubes. The steam and/or the hot water produced here are passed to the boiler drum 10. From said transverse collecting duct the burnt waste gases flow to the horizontally arranged gas duct 20 which then leads the waste gases to the waste heat boiler plant 6 arranged outside of the steelworks. In this embodiment the gas duct is formed to be a regeneratively working stone regenerator. 21 indicates an arrangement of checker-bricks (similar to the cowper of a blast furnace). The hot converter waste gases are cooled off on the stones thereby warming same up. The walls of said gas duct also are made of highly refractory brickwork. Dependent on the height of the gas temperature carbon blocks and/or graphite blocks can be used, too. Advantageously, in basic working furnaces a basic stone material will be used for said gas duct; in acid working furnaces inversely, of course.

13 indicates an additional heating means which is designed to compensate for heat variations. During periods in which no heat is produced by the converters cold air is sucked through the highly heated gas duct 20; said cold air is very highly heated while at the same time the stone material 21 is cooled. This air either can be sucked in through the suction hoods 2 or it can flow into the duct over the valve 22 if all the slides 4 are closed. The additional heating means 13 has the purpose only to keep the temperature nearly constant before entering the central waste heat boiler 6. Advantageously the waste heat boiler 6 always is working with a constant temperature of waste gas, the waste gas temperature being kept as constant as possible. The waste heat boiler 6 can comprise a radiation chamber 23, the super heaters 24 and the economiser 25. Of course, any other arrangements of heating surfaces can be chosen. The gases cooled in the waste heat boiler 6 then flow into the dust separating plant 26 and through the exhausters 27 and the chimney 9 into the open air. 10 indicates the boiler drum which receives and passes on the steam produced by all the heating surfaces, 28 indicates the shut-off valves which render it possible to connect and/or disconnect the single boiler groups. 29 shows the scrap iron hall of the steelworks. 30 is a slag car. 31 indicates the heavy construction of the steelworks (smoke hall) which can be constructed especially small by this provision of a transverse duct. 32 shows a crane in the heavy construction; said crane to be used for all the transportation works required there. 33 is the casting house of the steelworks. 34 indicates a bunker for additional materials (flux materials).

FIG. 5 shows the horizontal projection of the waste gas cooling and cleaning plant shown in FIG. 4. 7 and 8 show the gas duct formed to be a regenerator connecting the transverse collecting duct with the central waste heat boiler plant 6. This waste heat boiler plant here is subdivided into four groups three of same being working. The fourth group serves as a reserve 15. 26 shows the dust separating plants, 27 indicates the exhausters and 9 the chimneys. 19 are the water cooled chutes for supplying the additional materials whereas 14 again indicates the plants for the secondary air.

FIG. 6 shows a further embodiment of the invention in a front elevation. 1 indicates the three converters, in this case LD-converters are provided which reduce the crude iron to steel with pure oxygen. 2 shows the cooling cells of waste gas cooling plant. The waste gases coming from the converter are burned therein. 35 shows the shut-off devices which can be used to interrupt the gas flow from the cooling cells 2 to the transverse gas duct 11. In this figure for instance the converter on the left side is working. 36 indicates an emergency chimney which can be closed with a valve 37. This emergency chimney serves for rendering it possible that the converter can be operated at any time if damages must be repaired in the transverse duct 11. The converter waste gases then flow directly over roof. 38 shows the after coolers which can be formed to the convection heating surfaces of a steam generator or an injection cooler. 39 shows merely schematically a gas cleaning plant and 40 indicates the required exhausters which suck off the cooled and cleaned waste gases from the plant and lead some to the open air. 41 indicates the flow of gas, 50% of the burned waste gases at a time being passed through both the aftercoolers 38 and/or dust separators 39. That is to say, these parts of the plant are fully supplied at any time, the capacity of both the aftercoolers being sufficient commonly to take up the waste gases of one single converter. 42 shows merely schematically dust collecting devices which are to receive the dust obtained in the transverse duct 11. Schematically and by way of example the reference numeral 43 shows a steam collecting drum. 13a and b schematically indicate the burners of an additional firing which are to compensate for variations in the heat supply coming from the converters and/or which are used for putting the entire plant into operation. 44 shows two further shut-off devices which permit the middle part of the plant or both the left and the right cooling chimneys to be separated one from the other. 45 indicates by way of example the bundles of passage-heating surfaces of an aftercooler, whereas in 46 there is indicated an injection cooler as an aftercooler.

FIG. 7 shows a 2-converter-steelworks with waste heat boilers and dust separating plants a–s hitherto embodied in the form of single plants per converter, two units of 80 tons capacity each being shown here. 1 indicates both the converters. 6 are the waste heat boilers in schematic form. 39 shows both the dust separating plants. 40 indicates the suction ducts. 9 indicates the chimneys which lead the cleaned gases into the open air. 10 shows the boiler drums. The circulating pumps of the boilers and the feeding pumps are not shown. The relative sizes of the FIGURES 7 and 8 correspond to the example chosen in the specification.

FIG. 8 shows the solution according to the invention wherein the relative sizes between the FIGURES 7 and 8 approximately have been adapted to the actual conditions. Both the plants according to the example chosen in the specification shall produce about 850,000 tons of raw steel per year. 1 shows the steel converters of the 3-converter-steelworks. 2 shows schematically the cooling chimneys. 11 is the connecting transverse duct. 47 indicates both the aftercoolers working in common. 39 are the dust separating plants. 40 are the suction plants. 10 indicates the common boiler drum. The required circulation pumps of the boiler and the feeding pumps are not shown.

In FIG. 9 it is intended to show in the form of a diagram the great variation as to the steam production of the waste heat boilers. 48 shows the steam production of one converter charge with the very high steam peak. 49 shows the shut-down time of the converter from one charge in the other. 50 indicates one hour's time. The indicator 51 shows the height of the steam peak which the waste gas cooling and cleaning plant must be designed for. The horizontally hatched area 52 shows the amount of steam per hour regenerated from the converter waste heat. The obliquely hatched area 53 shows the steam peak resulting when the converter is operated; said steam peak must be taken into the steam regenerators 54 and must be passed onto the steam net during standstill of the converter.

It can be seen clearly that there occur very great variations in the steam production with a 2-converter operation, requiring very large regenerators.

FIG. 10 finally shows the 3-converter operations with the same steel production per year and is also drawn in correct scale with respect to FIGURE 9. 48 shows again the steam production of the single converter charges which, of course, is only the half of that of FIG. 9. The steam peak, too, which is indicated by the indicator 51 is only half as large as that in a 2-converter operation. The horizontally hatched area 52 again show the continuous steam supply which is gained from the waste heat, and that again referred to the hour. The indicator 55 shows the small difference between the steam peak and the continuous steam supply and proves very clearly that small or no steam regenerators are required in a 3-converter operation. 50 shows the hour mark. As may be seen from the small diagram 3 charges are blown per hour in a 3-converter operation whereas in the 2-converter operation as a maximum 1, 5 charges can be achieved per hour.

The FIGS. 6 to 10 shows the inventive idea schematically only and should not be considered restricting the invention in any manner. The comparison FIGS. 7, 8, 9 and 10 serve only to make clear the invention. The same goes for FIG. 11.

FIG. 11 shows a further important advantage of the invention. When enlarging an already existing steelworks with 2 converters and the required waste heat boilers and dust separating plants the invention allows at lowest costs a third converter to be installed which, besides, can have the double capacity of both the first converters. Further this construction according to the invention also allows the already existent converters to be enlarged to their double capacity.

FIG. 11 shows a 2-converter steelworks with the converters 1. There are existent both the waste heat boiler plants 6 with their radiation ducts 56 (precoolers) and their convection heating surfaces 57. Further there are existant the dust separators 39 and the suction ducts 40, the boiler drums 10 as well as the circulation pumps 58 and the feeding pumps 59. There is installed the third converter 60 which has the double capacity of the converters 1. There are newly to be built up the precooler 61 and the transverse ducts 11b as well as the shut-off devices 62. After this small work has been done the third converter 60 can burn its waste gases in the precooler 61 and then passes same through the transverse ducts 11b to the aftercoolers 37 of both the existing boilers 6. Even both the dust separators 39 and the suction ducts 40 are sufficient for double the output of the converter 60. The circulation pumps 58 and the feeding pump 59, too, of both the existent boilers are completely sufficient to receive double the capacity of the converter 60 as these aggregate now can be used (shunted).

I claim:
1. A plant for using and cooling waste gases of steel converters or the like comprising, in combination, a plurality of intermittently operated steel converters, each producing during operation hot waste gas gradually varying in temperature during each operation from a minimum temperature at the beginning of the operation to a maximum temperature and dropping to said minimum temperature at the end of the operation; a waste gas collecting hood for each converter for receiving waste gas therefrom, said hood having an outlet end; a common gas collecting duct communicating with the outlet end of the hood of each converter so that waste gases from all converters will pass through said common gas collecting duct, said duct having a discharge opening; means connected with said duct for maintaining at said discharge opening a substantially constant temperature of the gas passing therethrough and including heat regenerator means in said common duct which are heated up during the time the hot waste gases passing therethrough are at said maximum temperature and which give up heat to gases passing through said common duct when said gases have a temperature below said maximum temperature; and means communicating with said discharge opening of said common duct for transforming the heat content of the waste gas passing therethrough into useful energy while simultaneously cooling the waste gas.

2. A gas cooling and cleaning plant for waste gases of steel converters or the like comprising, in combination, a plurality of intermittently operated steel converters, each producing during operation hot waste gas gradually varying in temperature during each operation from a minimum temperature at the beginning of the operation to a maximum temperature and dropping to said minimum temperature at the end of the operation; a waste gas collecting hood for each converter for receiving waste gas therefrom, said hood having an outlet end; a common gas collecting duct communicating with the outlet end of the hood of each converter so that waste gases from all converters will pass through said common gas collecting duct, said duct having a discharge opening; means connected with said duct for maintaining at said discharge opening a substantially constant temperature of the gas passing therethrough and including heat regenerator means in said common duct which are heated up by hot waste gases passing therethrough and which give up heat to gases passing through said common duct having a temperature lower than that of the heated regenerator means and heating means communicating with said common duct downstream of said heat regenerator means; and waste gas boiler and dust collector means communicating with said discharge opening of said common duct for transforming the heat content of the waste gas passing therethrough into useful energy while simultaneously cooling and cleaning the waste gas.

3. A gas cooling and cleaning plant for waste gases of steel converters or the like comprising, in combination, a plurality of intermittently operated steel converters, each producing during operation hot waste gas gradually varying in temperature during each operation from a minimum temperature at the beginning of the operation to a maximum temperature and dropping to said minimum temperature at the end of the operation; a waste gas collecting hood for each converter for receiving waste gas therefrom, said hood having an outlet end; a common gas collecting duct communicating with the outlet end of the hood of each converter so that waste gases from all converters will pass through said common gas collecting duct, said duct having a discharge opening; means connected with said duct for maintaining at said discharge opening a substantially constant temperature of the gas passing therethrough and including heat regenerator means in said common duct which are heated up by hot waste gases passing therethrough and which give up heat to gases passing through said common duct having a temperature lower than that of the heated regenerator means and heating means communicating with said common duct for heating gas passing therethrough during intervals of operation of said steel converters; and waste gas boiler and dust collector means communicating with said discharge opening of said common duct for transforming the heat content of the waste gas passing therethrough into useful energy while simultaneously cooling and cleaning the waste gas.

4. A gas cooling and cleaning plant for waste gases of steel converters or the like as set forth in claim 3, and including means at each gas collecting hood for cooling the same; and means in the region of the outlet end of each hood for introducing combustion air in said waste gas for burning combustible components thereof as the waste gas passes from the respective hood into said common gas collecting duct.

5. A gas cooling and cleaning plant for waste gases of steel converters or the like comprising, in combination, a plurality of intermittently operated steel converters arranged in a row and each producing during operation hot waste gas of varying temperature; a waste gas collecting hood for each converter for receiving waste gas therefrom, said hood having an outlet end; common gas collecting duct means having a first portion extending substantially parallel to said row of steel converters and communicating with the outlet end of the hood of each converter, said first portion of said duct means having opposite ends and said duct means including a second portion communicating with said first portion intermediate said opposite ends and having a discharge opening so that waste gas from all converters will pass through said second portion and be discharged through said discharge opening intermediate said opposite ends; means cooperating with said second portion of said duct means for maintaining at said discharge opening a substantially constant temperature of the gas passing therethrough and including heat regenerator means in said second portion which are heated up by hot waste gases passing therethrough and which give up heat to gases passing through said second portion and having a temperature lower than that of the heated regenerator means and heating means communicating with said second portion downstream of said heat regenerator means; and waste gas boiler and dust collector means communicating with said discharge opening of said common duct for transforming the heat content of the waste gas passing therethrough into useful energy while simultaneously cooling and cleaning the waste gas.

6. A gas cooling and cleaning plant for waste gases of steel converters or the like as set forth in claim 5 and including at least two waste gas boiler units, means for selectively connecting and disconnecting said units to and from said discharge opening of said common gas collecting duct means, and at least one dust collector unit downstream of said waste gas boiler units.

References Cited by the Examiner

UNITED STATES PATENTS

| 1,552,316 | 9/1925 | Krieg | 98—115 |
| 2,065,850 | 12/1936 | Black et al. | 122—7 |
| 2,336,833 | 12/1943 | Badenhausen | 122—7 |
| 2,623,505 | 12/1952 | Armacost | 55—269 |
| 2,831,467 | 4/1958 | Guczky | 122—7 |
| 2,862,701 | 12/1958 | McFeaters | 98—115 X |

FOREIGN PATENTS

| 1,063,191 | 8/1959 | Germany. |
| 1,084,744 | 7/1960 | Germany. |

MORRIS O. WOLK, *Primary Examiner.*

JAMES H. TAYMAN, JR., *Examiner.*